Figure 1:
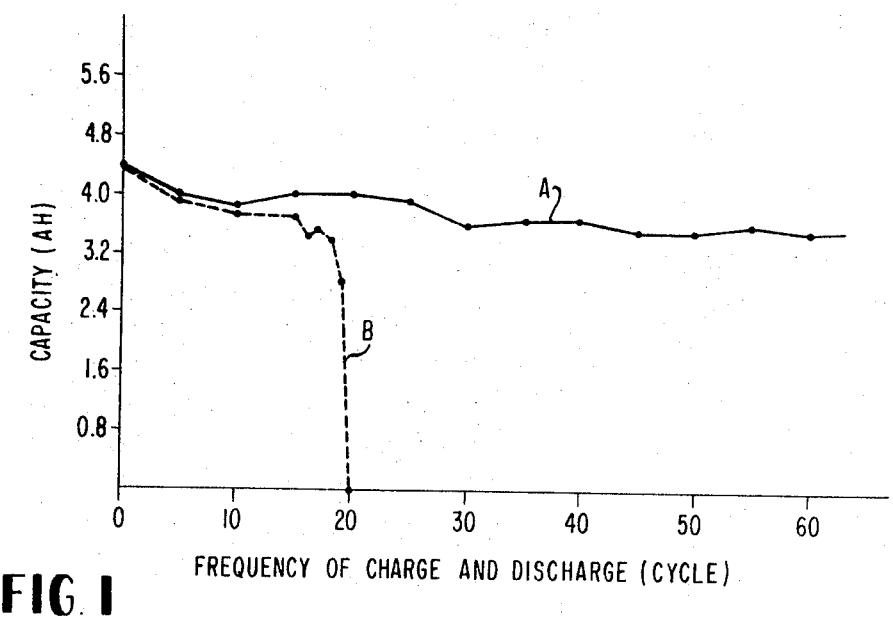

United States Patent
Kawakami

[15] 3,642,539
[45] Feb. 15, 1972

[54] SECONDARY BATTERY WITH INDATE ION IN THE ELECTROLYTE

[72] Inventor: Akira Kawakami, Ibaraki-shi, Japan
[73] Assignee: Hitachi Maxell, Ltd., Ibaraki-shi, Japan
[22] Filed: Dec. 31, 1969
[21] Appl. No.: 889,358

[30] Foreign Application Priority Data

May 16, 1969 Japan.................................44/38127

[52] U.S. Cl...............................................136/30, 136/154
[51] Int. Cl.......................................................H01m 41/02
[58] Field of Search................136/30, 6, 153, 154, 107, 102

[56] References Cited

UNITED STATES PATENTS

| | | | |
|---|---|---|---|
| 2,683,184 | 7/1954 | Boswell | 136/107 A |
| 2,959,631 | 11/1960 | Boswell | 136/107 |
| 3,226,260 | 12/1965 | Drengler | 136/30 |

Primary Examiner—Winston A. Douglas
Assistant Examiner—C. F. Lefevour
Attorney—Craig, Antonelli and Hill

[57] ABSTRACT

In a secondary battery (e.g., a zinc-alkali storage battery or secondary air battery) of conventional structure using zinc as an anode-active substance, the improvement wherein the electrolyte contains indate ion. Such a battery prevents the development in dendritic or spongy form of zinc metal during the charging state of the battery and maintains the electric capacity materially unchanged for a long duration of time.

9 Claims, 2 Drawing Figures

INVENTOR
AKIRA KAWAKAMI

BY
Craig, Antonelli, Stewart & Hill
ATTORNEYS

SECONDARY BATTERY WITH INDATE ION IN THE ELECTROLYTE

The present invention relates to an improvement in a secondary battery such as a zinc-alkali storage battery or a secondary air battery.

Heretofore, metal zinc has been used as the anode-active substance in a secondary battery because of its larger energy density per unit weight, lower cost and easier treatment. However, during the charging state of the battery, zinc oxide or zinc hydroxide produced as the result of discharge is precipitated as zinc metal in dendritic or spongy form on the anode existing in the electrolyte. Thus, the separator between the anode and the cathode is destroyed, a short circuit between the electrodes is caused and the battery is broken. Or, the discharge capacity is markedly lowered.

In order to overcome these drawbacks, an attempt has been made to incorporate a cyanide into the electrolyte. The addition of cyanide improves the precipitation of zinc considerably at the primary stage, but this additive reacts with the cathode-active or catalytic substance to form a complex, resulting in a decrease in the battery capacity later. An attempt has been made to add stannate ion to the electrolyte. Such an addition is effective when the electrolyte is circulated but, since the once produced tin is gradually accumulated on the anode because of its lower solubility in the electrolyte, a continuous and constant effect cannot be obtained unless a certain amount of stannate ion is successively added. Moreover, the anode plate becomes thicker by the accumulation of the produced tin with an increase in the frequency of charge and discharge so that the resistance in the circulation passage increases and the charge time becomes longer. It is thus necessary to design a large enough space between the electrodes, and the efficiency of the battery capacity with respect to the battery volume is hence inferior.

Accordingly, one of the objects of the present invention is to provide a secondary battery which overcomes the disadvantages and deficiencies of the prior art.

Another object of the present invention is to provide a way of preventing the deposition of zinc in dendritic or spongy form in a secondary battery.

A further object of the invention is to provide a secondary battery having zinc as the anode-active substance wherein the deposition of zinc metal on the anode is prevented without affecting the desirable properties of the battery.

These and other objects and advantages of the present invention will become apparent to those skilled in the art from a consideration of the following specification and claims.

In accordance with the present invention, it has been found that the incorporation of indate ion into the electrolyte prevents the deposition of zinc in dendritic or spongy form without any drawback in the usual advantageous properties of the secondary battery. The reason why indate ion has such an effect is not known with certainty. However, without intending to limit or affect the scope of the invention by the veracity of any theoretical explanation, the following presumptions are presently made. Zinc is produced as the result of charge piles gradually and spirally towards a certain direction around the cores existing on the anode, developing in dendritic or spongy form. The presence of numerous and uniformly distributed cores decreases the tendency of the zinc to develop in dendritic or spongy form, thus enabling an even electrodeposition of zinc. However, the production and extinction of cores on an ordinary substrate cannot be favorably controlled. When indate ion is present in the electrolyte, indium deposits among the metallic lattice of the electrodeposited zinc and serves as cores for the subsequent zinc electrodeposition. Since these cores change the direction of development of zinc piling spirally, an even electrodeposition of zinc is attained. The present invention results from this finding.

According to the present invention, a secondary battery is provided in which the electrolyte contains indate ion.

For obtaining the secondary battery of the invention, an alkali electrolyte solution including an oxide, a hydroxide or a salt (e.g., a nitrate or sulfate) of indium so as to form the indate ion ($InO_2^-$) may be used as the electrolyte upon construction of the battery. Alternatively, an indium compound as mentioned above may be added to the electrolyte so as to form the indate ion therein simultaneously with deposition of excess indate ion as an indate in solid form within the separator or at the bottom of the battery.

The indate ion to be incorporated into the electrolyte may be in a saturation amount or less in the electrolyte employed, because it serves only as cores for the subsequent zinc electrodeposition. Indium precipitated on a substrate and serving as cores for zinc electrodeposition is almost dissolved in the electrolyte on discharge and, therefore, the indate ion primarily present in the electrolyte is barely exhausted by repetition of charge and discharge.

The equilibrium formulas and the balanced potential between zinc and indium in a concentrated alkali solution as the electrolyte are as follows:

$Zn + 4\,OH^- = ZnO_2^{--} + 2\,H_2O + 2\,e^-$

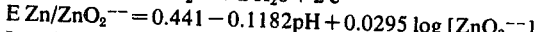
$E\ Zn/ZnO_2^{--} = 0.441 - 0.1182\,pH + 0.0295\,\log\,[ZnO_2^{--}]$

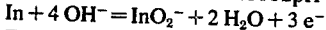
$In + 4\,OH^- = InO_2^- + 2\,H_2O + 3\,e^-$

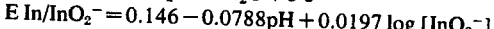
$E\ In/InO_2^- = 0.146 - 0.0788\,pH + 0.0197\,\log\,[InO_2^-]$

If $pH = 14$ and $[ZnO_2^{--}] = 1$, $[InO_2^-] = 10^{-5}$. Hence, the balanced potential becomes equal when the solution contains $10^{-13}$ mol/l. of $In\text{-}O_2^-$, and a sufficient amount of indate ion is thus very small. In the actual electrodeposition process, the kinetic balanced potential is inferior thereto owing to activation polarization and crystallization polarization, and a favorable zinc electrodeposition can be attained by the presence of a substantial saturation amount of indate ion. For instance, the saturation solubility of indate ion in an electrolyte of 10 mol/l. of potassium hydroxide is about $10^{-3}$ mol/l.

Practical embodiments of the present invention are illustratively shown in the following examples and are not to be considered as limiting.

EXAMPLE 1

Carbonyl nickel powder is scattered uniformly on the upper and lower surfaces of a nickel net as a support to provide a 1 mm. thick layer and is sintered in an inert atmosphere such as nitrogen. The resulting net, cut in a 60 mm. × 45 mm. size, is dipped in an aqueous solution of 70 percent by weight of nickel nitrate, electrolyzed and washed with water until an amount of nickel-active substance having a 1.2 ampere hour (AH) of electric capacity is charged. The resulting net is packed with a vinylon mixed paper of 0.1 mm. thickness and serves as a cathode.

A copper plate of 0.1 mm. thickness is cut to a 70 mm. × 50 mm. size, washed with a cleaning solution, amalgamated and electrodeposited evenly with zinc so as to have 20 mAH/cm.$^2$ of capacity, the thickness of the zinc being 0.1 mm. The resultant plate is used as an anode.

Five sheets of the cathode plate and four sheets of the anode plate are arranged face to face alternately, the cathode plate occupying both external sides. A separator of polypropylene net of 1 mm. thickness and 10 mesh is inserted between each cathode plate and the anode plate adjacent thereto. The resulting electrode set is placed in a cell of 60 mm. × 90 mm. × 25 mm. in size, and about 60 ml. of an alkali electrolyte solution prepared by dissolving indium oxide ($10^{-3}$ mol/l.) in an aqueous solution of potassium hydroxide (10 mol/l.) containing zincate ion (1 mol/l.) are charged therein to prepare a zinc-alkali storage battery [A].

In the same manner as above, another zinc-alkali storage battery [B], but containing no indate ion in the electrolyte, is prepared.

FIG. 1 shows the relationship between the frequency of charge and discharge and the discharge capacity in the batteries [A] and [B]. The discharge on each cycle is effected up to the end voltage at which 1 a. of discharge current and 1 volt of terminal voltage are reached. The charge is carried out with a charge current of 600 ma. for 8 hours to make a charge capacity of 4.8 AH. From FIG. 1, it is observed that the battery [A] gives an extremely slight depression in the discharge capacity (note the solid line), whereas the battery [B] affords a marked depression around the 15th cycle and thereafter (note the dotted line). In the latter case, the zinc anode grown in dendritic form through the separator contacts with the nickel cathode plate at the 20th cycle, whereby a short circuit is caused and the battery is destroyed.

EXAMPLE 2

Carbonyl nickel powder is scattered uniformly on the upper and lower surfaces of a nickel net as a support to a thickness of 1 mm. and is then sintered. in an inert atmosphere such as nitrogen. The net, cut in a 80 mm. × 60 mm. size, is dipped in an aqueous dispersion of 30 percent by weight of polytetrafluoroethylene containing amalgamated silver powder to obtain an air electrode plate impregnated with the oxygen-activating catalyst and the water repellent. A net of 0.2 mm. in wire diameter and 40 mesh is cut in a 70 mm. × 50 mm. size, washed with a cleaning solution and amalgamated so as to electrodeposit evenly zinc having a capacity of 100 mAH/cm.$^2$, the thickness of the zinc being 0.2 mm. The resultant plate, serving as an anode, is inserted between two sheets of the air electrode plate intervening a vinylon mixed paper of 0.1 mm. thickness and a polypropylene net of 0.5 mm. in wire diameter and 10 mesh. These are combined with an alkali electrolyte solution prepared by dissolving indium oxide ($10^{-3}$ mol/l.) in an aqueous solution of potassium hydroxide (10 mol/l.) containing zincate ion (1 mol/l.) to prepare a secondary air battery [A'].

In the same manner as above, another secondary air battery [B'], but containing no indate ion in the electrolyte, is prepared.

Figure 2:
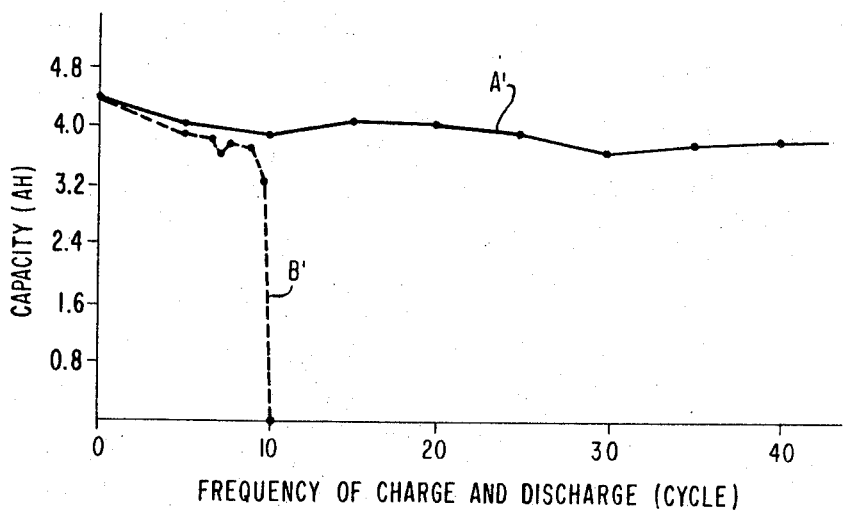

FIG. 2 shows the relationship between the frequency of charge and discharge and the discharge capacity in the batteries [A'] and [B']. The discharge on each cycle is effected up to the end voltage at which 1 a. of discharge current and 0.8 volt of terminal voltage are reached. The charge is carried out with a charge current of 600 ma. for 8 hours to make a charge capacity of 4.8 AH. From FIG. 2, it is observed that the battery [A'] gives an extremely slight depression in the discharge capacity (note the solid line), whereas the battery [B'] affords a marked depression around the seventh cycle and thereafter (note the dotted line). In the latter case the zinc anode grown in dendritic form through the separator contacts with the air electrode plate at the 10th cycle, whereby a short circuit is caused and the battery is destroyed.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A secondary battery comprising a cathode, an anode containing an anode-active substance consisting essentially of zinc and an alkaline electrolyte, said electrolyte containing indate ion preventing the deposition of zinc in dendritic form.

2. The improvement according to claim 1, wherein the secondary battery is a zinc-alkali storage battery.

3. The improvement according to claim 1, wherein the secondary battery is a secondary air battery.

4. A secondary battery in accordance with claim 1, wherein the electrolyte is an aqueous alkaline solution.

5. A secondary battery in accordance with claim 1, wherein the electrolyte is an aqueous solution of potassium hydroxide.

6. A secondary battery in accordance with claim 1, wherein a saturation amount of indate ion is present in said electrolyte.

7. A secondary battery in accordance with claim 1, wherein the electrolyte contains zincate ion.

8. A secondary battery in accordance with claim 1, wherein the cathode comprises nickel.

9. A method for preventing the deposition of dendritic and spongy zinc in a secondary battery, said battery comprising a cathode, an anode containing an anode-active substance consisting essentially of zinc and an alkaline electrolyte, which comprises employing an indate ion-containing electrolyte in said battery.

* * * * *